Sept. 27, 1955      J. S. YOUNG      2,719,052
TONGS
Filed July 25, 1952
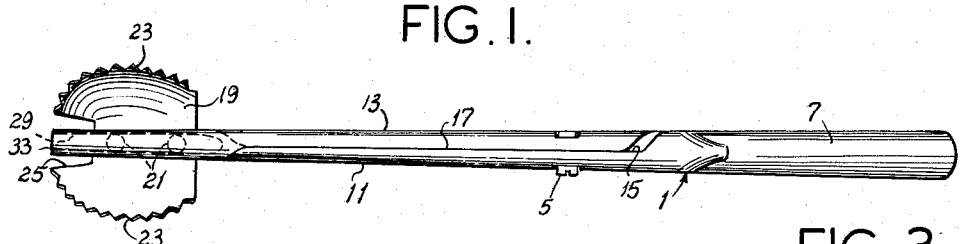
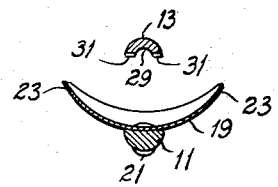
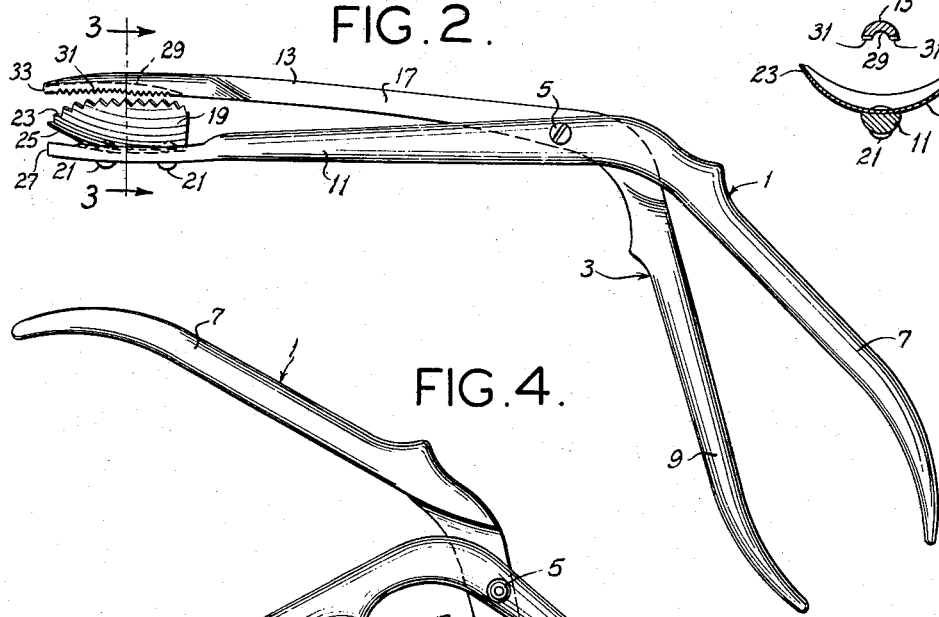
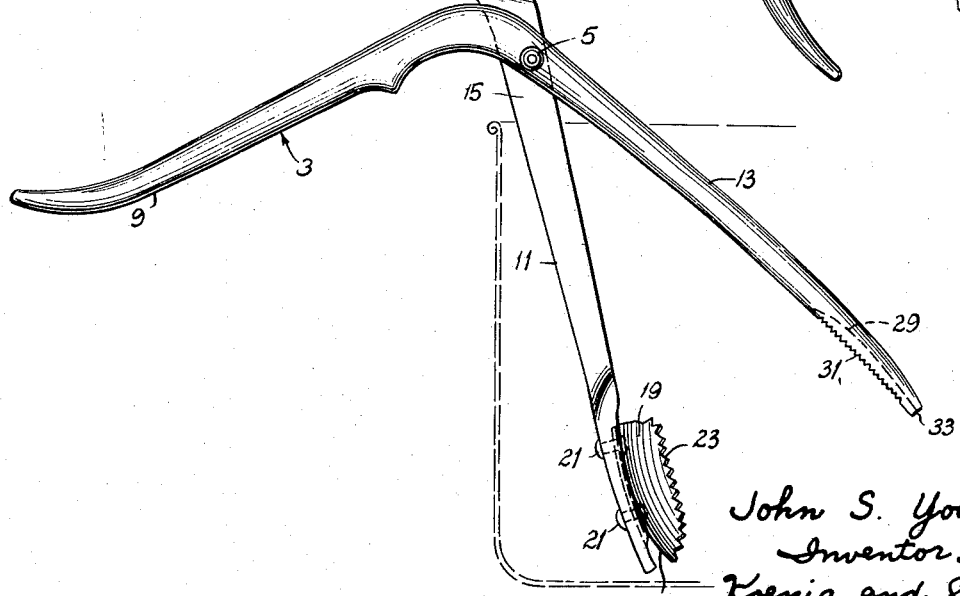
John S. Young, Inventor.
Koenig and Pope, Attorneys.

United States Patent Office 2,719,052  
Patented Sept. 27, 1955

2,719,052
TONGS

John S. Young, Clayton, Mo.

Application July 25, 1952, Serial No. 300,831

1 Claim. (Cl. 294—118)

This invention relates to tongs, and more particularly to tongs for kitchen use.

Among the several objects of the invention may be noted the provision of improved kitchen tongs for such uses as lifting eggs out of hot water, lifting hot pans, etc.; the provision of an implement of this class which may be better controlled and which may be used for picking up an egg out of a pan of hot water, for example, without having to reach over the pan; the provision of an implement of this class which provides for firmly gripping a pan as well as an egg; and the provision of an implement of this class, which, while having a spoon portion for conveniently gripping an egg, is also adapted for picking up smaller objects. Other objects will be in part apparent and in part pointed out hereinafter.

The invention accordingly comprises the elements and combinations of elements, features of construction, and arrangements of parts which will be exemplified in the structures hereinafter described, and the scope of which will be indicated in the following claim.

In the accompanying drawings, in which one of various possible embodiments of the invention is illustrated, Fig. 1 is a plan of an implement of this invention;

Fig. 2 is an elevation of Fig. 1;

Fig. 3 is a cross section taken on line 3—3 of Fig. 2; and,

Fig. 4 is an elevation illustrating the mode of using the tongs for lifting an egg out of a pan of hot water, a pan being shown in dotted lines.

Corresponding reference characters indicate corresponding parts throughout the several views of the drawings.

Referring to the drawings, which illustrate a preferred specific embodiment of the invention, reference characters 1 and 3 designate a pair of levers pivotally connected together at a point intermediate their ends as indicated at 5. Each of the levers consists, for example, of a one-piece metal forging. They could be made of other materials, molded of plastic, for example. The pivot is shown as consisting of a screw. The levers 1 and 3 have divergent rearward and forward pistol-grip handle portions or members 7 and 9, respectively, on one side of the pivot 5, and divergent lower and upper narrow jaw portions or members 11 and 13, respectively, on the other side of the pivot. The lower jaw member 11 is an extension of the rearward handle member 7, and the upper jaw member 13 is an extension of the forward handle member 9. The jaw portions 11 and 13, rather than being aligned with the respective handle portions 7 and 9, extend at an angle to the handle portions so that, as the tongs are held in the hand by the handle portions, the jaw portions extend forward from the hand without any twisting or other awkward positioning of the hand. The jaw portions 11 and 13 are relieved as indicated at 15 and 17, respectively, and the pivot 5 joins the relieved jaw portions so that the handle portions are coplanar.

The jaw members 11 and 13 are freely movable toward one another by moving the handle members 7 and 9 together and freely movable away from one another by moving the handle members apart. A spoon 19 is secured as by rivets 21 to the inside of the lower jaw 11 adjacent its outer end centered with respect to and facing the other jaw 13. The side edges of the spoon are preferably serrated as indicated at 21 for better gripping of an object such as a pan. The spoon 19 has a central notch 25 in its outer end and the tip 27 of the jaw 11 is exposed adjacent this notch. The upper jaw 13 is somewhat arched toward the lower jaw 11 with its outer end portion extending substantially centrally of the spoon and narrower than the notch for reception in the notch when the jaws are moved toward one another. The inside of the jaw 13, towards its outer end, is grooved as indicated at 29 and its edges on opposite sides of the groove are serrated as indicated at 31. The tip 33 of the jaw 13 is engageable with the exposed tip 27 of the jaw 11.

In use, the handle portions 7 and 9 are gripped in natural fashion in the hand, the jaws 11 and 13 projecting forward rather than laterally from the hand. Thus, in retrieving an egg from a pan of hot water, as illustrated in Fig. 4, the hand may be held to one side of the pan rather than directly above the hot water. This eliminates any possibility of scalding from steam rising from the pan. An egg may be very firmly gripped in the spoon by the serrated end portion of the jaw 13. The tongs may also be used to lift a pan by gripping the arcuate side wall of the pan between the serrated side edges 23 of the spoon and the serrated end portions 31 of the jaw 13, with the spoon on the outside of the pan. Small objects may be gripped at the notch 25 between the exposed tip 27 of the jaw 11 and the tip 33 of the jaw 13.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

Kitchen tongs comprising a pair of levers pivotally connected together at a point intermediate their ends, said levers having forward and rearward divergent pistol-grip handle members on one side of the pivot and upper and lower jaw members on the other side of the pivot extending from the pivot in opposed relation to one another and at such an angle to the handle members that, as the tongs are held in the hand in pistol-grip manner by the handle members, the jaw members extend laterally from the handle members and from the hand, the lower jaw member being an extension of the rearward handle member and the upper jaw member being an extension of the forward handle member, the upper jaw member being freely movable toward and away from the lower jaw member by moving the forward handle member toward and away from the rearward handle member, a spoon on the inside of the lower jaw member at its outer end facing the end portion of the upper jaw member, said spoon being wider than said lower jaw member and having serrated side edges and a central notch in its forward end, the upper jaw member being arched toward the lower jaw member with its end portion extending substantially centrally of the spoon and being narrower than the notch for reception in the notch when the jaw members are moved toward one another, and the inside face of said end portion of the upper jaw member being serrated.

(References on following page)

References Cited in the file of this patent

UNITED STATES PATENTS

| | | |
|---|---|---|
| 66,492 | Hellen | July 9, 1867 |
| 663,003 | Barger | Dec. 4, 1900 |
| 708,014 | Blagden | Sept. 2, 1902 |
| 828,625 | Ogg | Aug. 14, 1906 |
| 1,643,456 | James | Sept. 27, 1927 |
| 1,653,803 | Fisher | Dec. 27, 1927 |
| 2,218,607 | Gantz | Oct. 22, 1940 |
| 2,316,731 | Walter | Apr. 13, 1943 |
| 2,404,224 | Fink | July 16, 1946 |
| 2,531,987 | Pilliod | Nov. 28, 1950 |
| 2,561,374 | Igoe | July 24, 1951 |
| 2,587,486 | Kogan | Feb. 26, 1952 |
| 2,600,445 | Sundstrand | June 17, 1952 |